United States Patent [19]

Achleitner

[11] Patent Number: 4,984,818

[45] Date of Patent: Jan. 15, 1991

[54] WHEEL SUSPENSION

[75] Inventor: August Achleitner, Weil der Stadt, Fed. Rep. of Germany

[73] Assignee: Dr. Ing. h.c.F. Porsche AG, Fed. Rep. of Germany

[21] Appl. No.: 421,325

[22] Filed: Oct. 13, 1989

[30] Foreign Application Priority Data

Oct. 27, 1988 [DE] Fed. Rep. of Germany ....... 3836561

[51] Int. Cl.$^5$ .......................... B60G 3/14; B60G 11/14
[52] U.S. Cl. .................................................... 280/701
[58] Field of Search ............... 280/690, 688, 713, 720, 280/710, 660, 701

[56] References Cited

U.S. PATENT DOCUMENTS

| | | | |
|---|---|---|---|
| 3,804,433 | 4/1974 | Scherenberg et al. | 280/701 |
| 4,653,772 | 3/1987 | Sautter | 280/696 |
| 4,664,412 | 5/1987 | Matschinsky | 280/701 |
| 4,840,393 | 6/1989 | Mueller et al. | 280/701 |

FOREIGN PATENT DOCUMENTS

| | | |
|---|---|---|
| 3337255 | 2/1985 | Fed. Rep. of Germany . |
| 3405174 | 9/1985 | Fed. Rep. of Germany . |
| 0278088 | 8/1988 | Fed. Rep. of Germany . |

*Primary Examiner*—Richard A. Bertsch
*Attorney, Agent, or Firm*—Evenson, Wands, Edwards, Lenahan & McKeown

[57] ABSTRACT

The wheel suspension for motor vehicles comprises at least one wheel guiding element which is below a wheel drive shaft and is connected with a coil spring held separately from a shock absorber. The coil spring is pivoted at the wheel guiding link by means of an interposed guiding element and is guided by means of an auxiliary control arm. The guiding element comprises a spring plate disposed above the drive shaft, the projected surface of which intersects with the adjacently extending drive shaft.

5 Claims, 2 Drawing Sheets

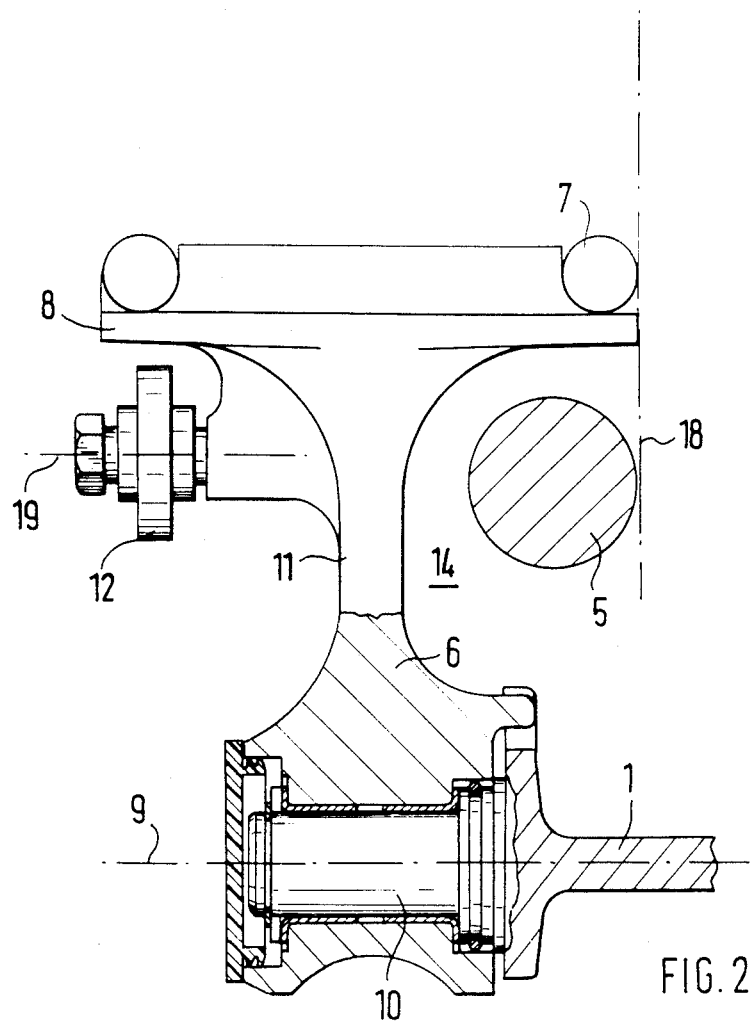

WHEEL SUSPENSION

BACKGROUND AND SUMMARY OF THE INVENTION

The present invention generally relates to a wheel suspension; and more particularly to a wheel suspension with a coil spring which is arranged separately from a spring strut, has a free space for a drive shaft, and ensures an optimal guiding of the coil spring.

A wheel suspension is disclosed by German Patent Specification (DE-PS) 34 05 174 in which a coil spring is supported separately from a shock absorber on a wheel guiding link. The coil spring extends into a plane below a wheel drive shaft in which the wheel guiding link is pivoted on a wheel carrier. In order for the coil spring to be arranged without any contact with the drive shaft guided through transversely with respect to the wheel, it has a joining piece in this area which is free of windings. This joining piece connects the upper spring part with the lower spring part and makes it possible for the drive shaft to extend through the enveloping cylinder of the coil spring. In this type of a construction, the lower spring pad fastened to the link always takes up the angle of inclination of the link which may result in a buckling of the coil spring.

It is an object of the present invention to provide a wheel suspension with a coil spring which is arranged separately from a spring strut, has a free space for a drive shaft, and ensures an optimal guiding of the coil spring.

Principal advantages achieved by preferred embodiments of the invention are that, in the case of a double-wishbone axle, despite a coil spring which is arranged separately from a spring strut and which, above a wheel drive shaft, is supported on a guiding element, a relatively large shock absorber ratio is achieved. By means of the auxiliary construction of a guided lower spring plate, the coil spring may be arranged separately which is utilized for the increase of the damper ratio.

In order to avoid a buckling or a snapping of the unguided coil spring in the extreme positions, the coil spring according to preferred embodiments of the invention is advantageously supported on spring plate rotatably disposed at the lower wishbone. In addition, this spring plate is guided by means of an auxiliary control arm which, if it is arranged in parallel to the lower wishbone, ensures an approximately parallel guiding of the lower spring plate with respect to the upper spring pad, so that a buckling of the coil spring is avoided.

In addition to these advantages, it is achieved by means of the guiding element connected with the wishbone that the drive shafts led to the wheels can extend free of the coil spring without contacting them even under extreme driving conditions. For this purpose, the guiding element is equipped with an approximately vertically aligned stem which is passed by the drive shaft.

Other objects, advantages and novel features of the present invention will become apparent from the following detailed description of the invention when considered in conjunction with the accompanying drawings.

BRIEF DESCRIPTION OF THE DRAWINGS

FIG. 2 is a sectional view according to Line II—II of FIG. 1.

DETAILED DESCRIPTION OF THE DRAWINGS

Figure 1:
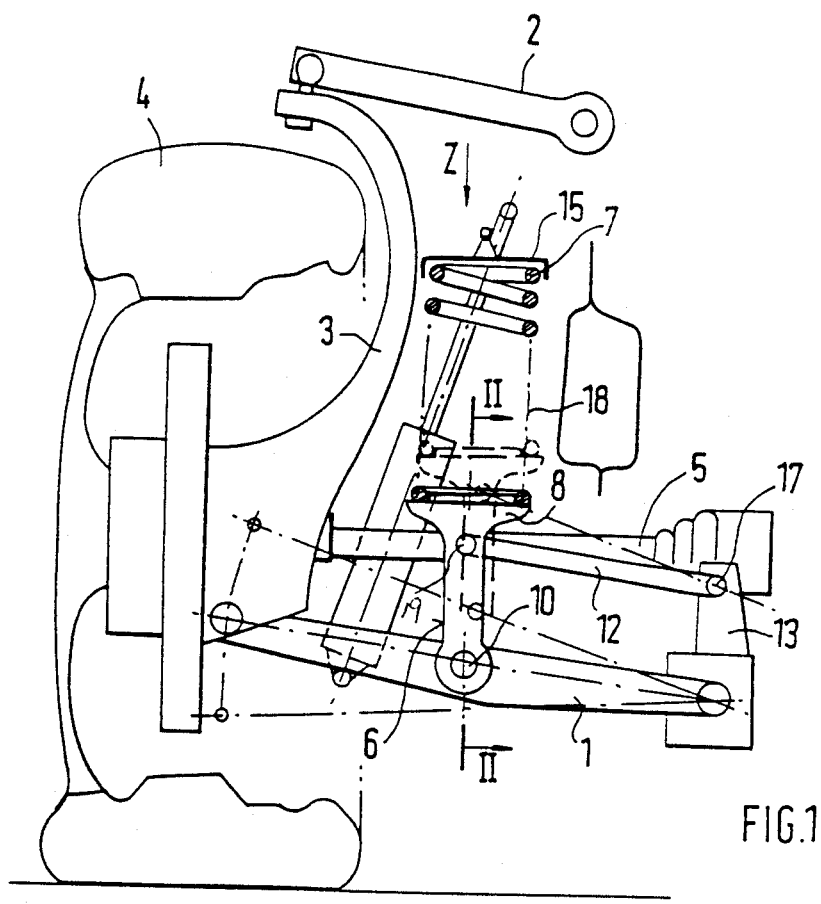
FIG. 1 is a front view of the wheel suspension according to one embodiment of the present invention when the wheel is compressed and rebounded.

An embodiment of the invention is shown in the drawings and will be described in detail in the following.

The wheel suspension comprises a double wishbone comprising a lower wheel guiding link 1 and an upper link 2 which are pivotally connected with a wheel carrier 3 which is connected with a wheel 4. This wheel 4 is driven by a drive shaft 5 which is arranged in transverse direction of the vehicle.

A coil spring 7 is disposed on the lower transverse link 1 with the interposition of a guiding element 6, this coil spring 7 supporting itself on a spring plate 8 of the guiding element 6. This guiding element 6, pivotably around a shaft 9 extending in longitudinal direction of the vehicle, is held at the lower link 1. For this purpose, a pin 10, on which the guiding element 6 supports itself, is fastened laterally of the link 1.

The guiding element 6 is provided with a stem 11 which is directed vertically upwards from the pin 10 and which, on the end side, expands to form the spring plate 8 which is arranged above the drive shaft 5 as best seen in FIG. 2. This drive shaft 5 extends close to the stem 11 through a formed free space 14 between the spring plate and the stem 11, intersects with the projected surface of the spring plate 8, and with a partial area, is arranged inside an enveloping cylinder 18 of the coil spring 7 as seen in FIG. 1.

In the area of the stem 11, an auxiliary control arm 12 is connected with the guiding element 6, extends in transverse direction of the vehicle and can be pivoted around a shaft 17 at the vehicle body 13 as well as around a shaft 19 at the stem 11.

As shown in detail in FIG. 1, the lower spring plate 8 of the guiding element 6, as a result of being guided by means of the auxiliary control arm 12, during springing operations, moves approximately in parallel to the upper spring plate 15.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A motor vehicle wheel suspension double wishbone axis, comprising at least one wheel guiding link which is arranged below a wheel drive shaft and is operatively connected with a shock absorber and a coil spring held separately from the shock absorber, wherein the coil spring is pivotally held at the at least one wheel guiding link by an interposed guiding element and is guided by an auxiliary control arm, and the interposed guiding element comprises a spring plate which is disposed above the wheel drive shaft, a projected surface of the spring plate intersecting with the wheel drive shaft which extends adjacent to the spring plate.

2. A wheel suspension according to claim 1, wherein the interposed guiding element, pivotally-mounted around a horizontal shaft aligned in a longitudinal direction of the vehicle, is held in a bearing on a link side therein and is supported by the auxiliary control arm which is parallel to the wheel guiding link and is pivoted around a shaft on a body of the vehicle.

3. A wheel suspension according to claim 2, wherein the interposed guiding element comprises a vertically aligned stem which, in transverse direction of the vehicle, forms a free space for permitting a positioning of the drive shaft inside an extended imaginary cylinder of the coil spring.

4. A wheel suspension according to claim 1, wherein the interposed guiding element comprises a vertically aligned stem which, in transverse direction of the vehicle, forms a free space for permitting a positioning of the drive shaft inside an extended imaginary cylinder of the coil spring.

5. A wheel suspension according to claim 3, wherein the auxiliary control arm is pivotally mounted around a horizontal shaft at the stem of the interposed guide element on the pin arranged opposite the drive shaft.

* * * * *